United States Patent [19]

Howell et al.

[11] Patent Number: 4,551,502

[45] Date of Patent: * Nov. 5, 1985

[54] MACROMOLECULAR COMPLEXES OF AMIDOCARBONYLIC WATER-SOLUBLE POLYMERS AND SQUARE PLATINOUS AND EQUIVALENT ORGANOMETALLICS

[76] Inventors: Bobby A. Howell, 1948 Willow Dr., Mt. Pleasant, Mich. 48858; Erik W. Walles, 216 E. South St. Apt. #1, Woodstock, Ill. 60098

[*] Notice: The portion of the term of this patent subsequent to Sep. 20, 2000 has been disclaimed.

[21] Appl. No.: 533,516

[22] Filed: Sep. 19, 1983

Related U.S. Application Data

[63] Continuation-in-part of Ser. No. 75,722, Sep. 14, 1979, Pat. No. 4,405,757.

[51] Int. Cl.[4] .................................................. C08F 8/42

[52] U.S. Cl. ................................. 525/326.9; 556/110; 556/111; 556/41; 556/113; 556/137; 556/138; 556/139; 556/116; 548/109; 548/402; 548/404; 544/181; 544/64; 546/11; 546/9; 546/10; 546/12; 260/239.3 R; 556/117; 556/146; 556/148; 548/107

[58] Field of Search ................. 260/429 R, 430, 438.1, 260/439; 525/326.9

[56] References Cited

U.S. PATENT DOCUMENTS 4,217,249  8/1980  McVicker ........................ 260/429 R
4,278,660  7/1981  Allcock ................................ 424/78

Primary Examiner—Paul R. Michl
Attorney, Agent, or Firm—Basile, Weintraub & Hanlon

[57] ABSTRACT

Novel complexes are prepared from water-soluble compounds having at least one amidocarbonylic unit and a square planar organometallic compound.

53 Claims, No Drawings

MACROMOLECULAR COMPLEXES OF AMIDOCARBONYLIC WATER-SOLUBLE POLYMERS AND SQUARE PLATINOUS AND EQUIVALENT ORGANOMETALLICS

CROSS-REFERENCE TO RELATED APPLICATIONS

This application is a continuation-in-part application of copending U.S. patent application Ser. No. 075,722, filed Sept. 14, 1979, now U.S. Pat. No. 4,405,757 for "Macromolecular Complexes of Amidocarbonylic Water-Soluble Polymers and Square Platinous and Equivalent Organometallics", the disclosure of which is hereby incorporated by reference.

FIELD OF THE INVENTION

The present invention concerns the formation of chemical complexes derived from square organometallic compounds. More particularly, the present invention concerns the formation of chemical complexes from water-soluble compounds and square planar organometallic compounds. Even more particularly, the present invention concerns the formation of chemical complexes from water-soluble amidocarbonylic compounds and square planar organometallic compounds.

PRIOR ART

As noted in the above-identified copending application, the art has long recognized the existence and utility of square planar organometallic compounds and their anti-tumor activity. Typifying the art is, for example, U.S. Pat. Nos. 3,904,663; 4,137,248; 4,256,652; 4,151,185; 4,219,650 and 4,255,347.

In administering drugs of this nature, ease of administration, toxicity and the like become matters of great concern, because of the receptor's reaction to these compounds. To minimize the "side-effects" of these drugs, which can, generally, be defined as "cisplatin" drugs, they have been modified to render them more compatible with the receptors metabolism.

Most recently, there has been disclosed by Meischen et al, in the *Journal of Clinical Hematology and Oncology*, Vol. 12, No. 3, p. 67 et seq, in an article entitled "Synthesis and Antitumor Activity of N-Phosphonacetyl-L-aspartato(1,2-diaminocylcohexane) platinum(II)", a new water-soluble compound corresponding to the formula:

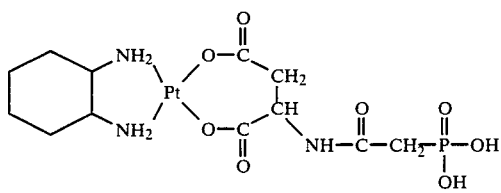

This compound contains the features essential for antitumor activity, i.e. a square planar platinum compound with two inert ligands in a cis relationship to each other and two labile ligands, also, cis to each other, occupying the other coordination sites. The compound contains the phosphonate group to increase water solubility. The present invention as disclosed herein and in the copending application seeks to improve upon the art by forming "complexes" of certain water-soluble compounds and the square-planar organometallic compounds by offering the potential of time-release of the drug.

SUMMARY OF THE INVENTION

In accordance with the present invention, novel chemical compounds are provided from a chemical complex comprised of (a) a water-soluble compound having at least one amidocarbonylic unit and (b) a square planar organometallic compound.

The water-soluble compound contemplated herein, generally corresponds to one of the formulae:

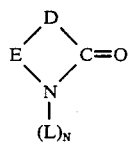

wherein C is carbon, N is nitrogen, O is oxygen, D is a divalent unit selected from the group consisting of oxygen, amino, linear alkylene having from 1 to 4 carbon atoms in the alkylene portion, methylene carbonyl, ethylene carbonyl and amido anhydride; E is an organic unit which introduces 2 to 3 carbon atoms into the heterocyclic ring; L is selected from the group consisting of vinyl, allyl or isopropenyl, n is an integer ranging from about one to about 5,000; or

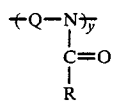 (II)

wherein Q is either a linear or branched alkylene group of the formula;

wherein Rs is either hydrogen or lower alkyl having from 1 to 7 carbon atoms in the alkyl portion; R is either alkyl, haloalkyl or aminoalkyl having from about 1 to 10 carbon atoms in the alkyl portion, and y is an integer from about 2 to about 5,000; or

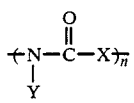 (III)

wherein X is either alkyl, hydroxyalkyl, carboxyalkyl or aminoalkyl having from about 1 to about 20 carbon atoms in the alkyl portion, aryl, heteroaryl or substituted aryl; Y is either hydrogen or any X; n is an integer ranging from about 1 to about 5000; or $$\begin{array}{c} Y \\ | \\ +X-C\!\!\!/_{\!\!\!n} \\ | \\ C=O \\ | \\ N-R_1 \\ | \\ R_2 \end{array} \quad \text{(IV)}$$

X is as defined in (III) above; Y is either hydrogen or any X; $R_1$ is any Y; $R_2$ is any Y; n is an integer ranging from 1 to about 5000.

The square planar organometallic compound which complexes with the water-soluble compound, generally, corresponds to the formula:

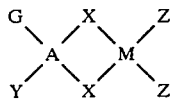

wherein M is a metal selected from either Group I B or Group VIII B of the Periodic Table, A is a substituted aromatic or heteroaromatic compound having substituents which function as a component of a bidentate ligand; X is an ortho substituent or a heteroatom which can bond to the metal; Y is either a substituted or unsubstituted amino group, sulfoxy, sulfhydryl, nitro, sulfonyl, amino, thiosulfonyl, ureido, amido, ureylene, hydroxy or carboxy; G is either hydrogen or any Y, and each Z is, independently, a monodentate ligand or bonding sites within a multidentate ligand.

Generally, the complexes hereof are prepared by mixing the water-soluble compound and the organometallic compound together. The complexes are prepared in the presence of water, as a solvent, either, alone or in admixture with other solvents. The complexes may be recovered as a precipitate or otherwise. Ordinarily, complex formation occurs at ambient or room temperature, but can be conducted at a temperature ranging from about 15° C. to about 50° C. The complex formation, which is an equilibrium formation, generally takes place in from about five to about fifteen minutes. Likewise, the pH of the complexing medium should be acidic. Generally, the pH should range from about 1 to about 10, and, preferably, is from about pH 3 to about pH 6.

For a more complete understanding of the present invention reference is made to the following detailed description and accompanying examples.

DETAILED DESCRIPTION OF THE PREFERRED EMBODIMENTS

In accordance with the present invention novel chemical compounds are provided from a chemical complex of (a) a water-soluble compound having at least one amidocarbonylic unit and (b) a square planar organometallic compound.

The water-soluble compounds contemplated herein, generally, correspond to either of the following formulae:

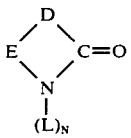

wherein C is carbon, N is nitrogen, O is oxygen, D is a divalent unit selected from the group consisting of oxygen, amino, linear alkylene having from 1 to 4 carbon atoms in the alkylene portion, methylene carbonyl, ethylene carbonyl and amido anhydride; E is an organic unit which introduces 2 to 3 carbon atoms into the heterocyclic ring; L is selected from the group consisting of vinyl, allyl or isopropenyl, n is an integer ranging from about 1 to about 5,000; or

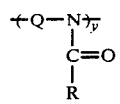

wherein Q is either a linear or branched alkylene group of the formula:

wherein $R_s$ is either hydrogen or lower alkyl having from about 1 to about 7 carbon atoms in the alkyl portion; R is either alkyl, haloalkyl or aminoalkyl having from about 1 to about 10 carbon atoms in the alkyl portion; and y is an integer from about 2 to about 5000; or

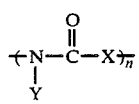

wherein X is either alkyl, hydroxyalkyl, carboxalkyl or aminoalkyl having from about 1 to about 20 carbon atoms in the alkyl portion, aryl, heteroaryl or substituted aryl; Y is either hydrogen or any X; n is an integer ranging from about 1 to about 5000; or

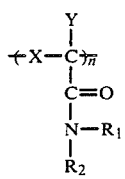

X is as defined in (III) above; Y is either hydrogen or any X; $R_1$ is any Y; $R_2$ is any Y; n is an integer ranging from 1 to about 5000.

Illustrative of the monomeric or polymeric heterocyclic entities contemplated in Formulae I and II hereof are, for example:

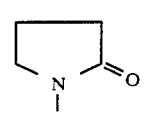 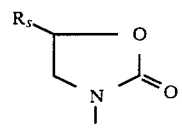

(2-pyrrolidinone) (2-oxazolidinone, in which $R_s$ can be H or a lower alkyl such as methyl, ethyl, etc. up to 6 or so C's)

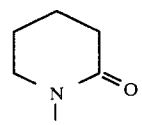 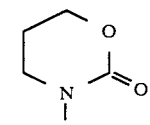

(2-piperidone) (2-oxazinidinone)

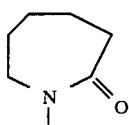 (caprolactam)

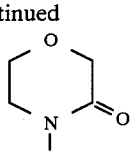 (2-morpholinone)

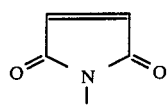 (succinimid)

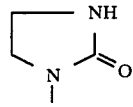 (imidazolidinone)

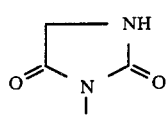 (hydantoin)

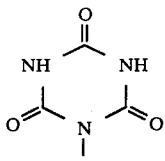 (cyanuric acid)

Although the Formula (I) and (II) polymers are, usually, homopolymeric, they can be utilized in copolymer form. The copolymers can include more than a single specie of the Formula (I) or compound copolymers of more than a single specie of the Formula (II-M) or copolymers of one or more of the Formula (I) monomers with one or more of the Formula (II-M) monomers. Other copolymers can be formed from one or more of the monomeric species of the formula (I) and/or one or more of the monomeric species of the (II-M) Formula and with other ethylenically (frequently monoethylenically) unsaturated monomers distinct from those of Formulae (I). Where the copolymers are formed with such other ethylenically unsaturated monomers it is advantageous for the resulting copolymer to contain, based on total copolymer weight, at least about 50 wt. % of at least one Formulae (I) and/or (II-M) monomer and, preferably, at least about 75–80 weight percent.

Illustrative of the monomers adapted to be the ethylenically unsaturated compounds which can be copolymerized with Formulae (I) and (II-M) monomerics are, for example, 1,3-butadiene; 2,3-dimethyl-1,3-butadiene; isoprene; piperylene; 3-furyl-1,3-butadiene; 3-methyl-1,3-butadiene; chloro-1,3-butadiene; 2-bromo-1, 3-butadiene; 2-chloro-3-methyl-1,3-butadiene; styrene; p-chlorostyrene; p-methoxystyrene, alpha-methylstyrene; vinylnaphthalene; acrylic acid; methacrylic acid; methyl acrylate; ethyl acrylate; methyl alpha-chloroacrylate; methyl methacrylate; ethyl methacrylate; butyl methacrylate; methyl methacrylate; acrylonitrile; methacrylonitrile; methacrylamide; methyl isopropenyl ketone, methyl vinyl ketone; methyl vinyl ether; vinylethynyl alkyl carbinols; vinyl acetate; vinyl chloride; vinylidene chloride; vinylfuran; vinylcarbozole; N-vinyl-3-morpholinone; vinyl formate; maleic acid; itaconic acid; fumaric acid; crotonic acid; allyl alcohol; vinyl fluoride; 2-chloroally alcohol; 1-allyloxy-3-chloro-2-propanol; N-vinylsuccinimide; N- tertiarybutyl acrylamide; N-tertiaryoctyl acrylamide; 1,2-dichloropropene-2; 1,2-dichloropropene-1; tri-, tetra- and- penta-chlorostyrene; o-, m- and p-methyl styrene; p-tertiarybutylstyrene; p-isopropylstyrene; p-phenyl styrene; p-benzoyl styrene; p-cyanostyrene; m-nitrosostyrene; m-trifluoromethylstyrene; m-fluorostyrene; m-tertiarbutyl styrene; stearoylstyrene; olcoylstyrene; linolcoylstyrene; alpha-vinylnaphthalene; beta-vinyl naphthalene; 1-(alpha-naphthyl)-propene-1; 2-(alphanapthyl)-propene-1; 2-(alpha-naphthyl)-butene-2; 3-(alpha-naphthyl)-pentene-2; 2-bromo-4-trifluoromethylstyrene; beta-bromo-alpha,-beta-diiodostyrene; beta-bromo-p-methylstyrene; betabromo-p-dinitro-styrene; m-secondarybutylstyrene; alpha,beta-dibromostyrene; beta,beta-dibromostyrene; alpha-chloro-2,4,6-trimethylstyrene; alpha-chloro-2,3,4,6-tetramethylstyrene; beta-chloro-o-nitrostyrene; 1-chloro-2-(p-tolyl)-1-butene; 4-(2-chlorovinyl)-anisole; 2-(1-chlorovinyl)-4-methylanisole; 1-chloro-4-vinylnaphthylene; 4(1-chlorovinyl)-2-isopropyl-5-methylanisole; 4(2-chlorovinyl)-2-isopropyl-5-methylanisole; p-cyclohexylstyrene; 2-ethyl-1-phenyl-1-butene; 3,5-diethyl styrene; 4-fluoro-3-trifluoromethyl-alpha-methylstyrene; alpha, alpha,alphatrifluoro-m-propenyltoluene; 2-isopropyl-5-methyl-4-vinyl anisole; 2-methyl-3-phenyl2-pentene; methyl styryl ether; N,N-dimethyl-m-vinylaniline; 2-(alpha-naphthyl)-2-butene; 1,1-diphenylethylene; propenyl benzene; stilbene; 1-vinylacenaphthene; p-vinylbenzonitrile; p-vinylbiphenly; 2-vinylfluorene; 6-vinyl-1,2,3,4-tetrahydro-naphthalene; p-vinylphentole; vinylbutyrate; vinylbenzoate; vinylquinoline; 2-vinylpyridine; 2-methyl-5-vinylpyridine, 4-vinylpyridine; N,N-diallyl-acrylamide; diallylamine; diallylmethacrylamide; 2,5-dimethyl-3,4-dihydroxy-1,5-hexadiene; 2,5-dimethyl-2,4-hexadiene; divinyl-benzene; the divinyl ester of diethylene glycol; trivinylbenzene; 2,7-dimethyl-1,7-octadiene; p-diisopropenylbenzene; 1,3,5-tri-isopropenylbenzene; p,p'-diisoprophenyldiphenyl; 1,1,3,3-tetrallyl-1,3-propanediol; 1,1,3,3-tetramethallyl-1,3-propanediol;

Representative of the Formula III compounds are, the polyoxazolines, such as poly(ethyloxazoline) and representative of Formula IV are the polyacrylamides, such as the polyacrylamides sold commercially under the name SEPARAN AP30.

Within the broad class of useful water-soluble compounds, particularly preferred are poly(2-ethyloxazoline), poly(N-vinyl-2-methyloxazolidinone) and poly(N-vinylpyrrolidone).

The square planar organometallic compound which is complexed with the water-soluble polymer, as noted hereinbefore, corresponds to the formula:

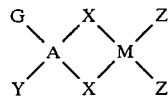

wherein M is a metal selected from Group IB or Group VIIIB of the Periodic Table, A is a substituted aromatic or heteroaromatic compound having substituents which function as a component of a dibentate ligand; X is an ortho substituent or a heteroatom which can bond to the metal; Y is either a substituted or unsubstituted amino group, sulfoxy, sulfhydryl, nitro, sulfonyl, amino, thiosulfonyl, ureido, amido, ureylene, hydroxy or carboxy; G is either hydrogen or any Y, and each Z is, independently, a monodentate ligand or bonding sites within a multidentate ligand.

Representative of the substituent compounds which can function herein are, for example: halo, such are chloro, bromo, fluoro and iodo; ammonia; nitrate; 1,2-diaminocyclohexane; cycloalkylamines, such as, cyclopropylamine, cyclobutylamine, cyclopentylamine, cyclohexylamine, etc.; alkylene imines, such as, ethylene imine, propylene imine, butylene imine, etc.; substituted amines of the formula:

ethylene diamine, substituted carboxylates of the formula:

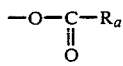

where $R_a$ is alkyl, cycloalkyl, aryl, halo-substituted cycloalkyl or aryl, $R_a$ having from about 1 to about 9 carbon atoms; monovalent or divalent dibasic acids and half-acid dibasic acids, such as oxalic, malonic, succinic and glutaric, the mono- and dicarboxylate forms which provide, respectively, monodentate or bidentate ligands for M, the half-acid corresponding to the formula:

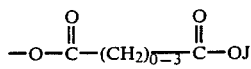

where J is hydrogen, alkali metal or —NH$_4$; 1,2-cycloalkane dicarboxylates in which the cycloalkane ring may be halo-, alkyl-, cycloalkyl-, or aryl-substituted, the ring portion, including any substituents having from about 3 to about 10 carbon atoms; 1,2-aryl dicarboxylate in which the aromatic radical be halo-, alkyl-, cycloalkyl- or aryl- substituted, the aromatic portion, including any substituents having from about 6 to about 12 carbon atoms; and, glyceric acid derivatives or glycerate radicals of the formula:

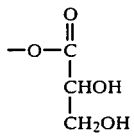

Additionally, Z may be Y, as enumerated below. A is an aromatic or heterocyclic entity. X may have the nitrogen inclusions in the entity when A is heterocyclic so as to actually be part of the heterocyclic structure. Under such conditions A must have at least one substituent thereon selected from the members of Y group and where A is:

a substituted benzene in ortho connection to each of the respective X units;

a substituted naphthalene in 1,8- or other ortho connection to each of the respective X units;

a substituted bipyridyl in either attachment to the respective X units through connection with the heterocyclic nitrogens in the bipyridyl or which X units are actually the heterocyclic nitrogens in the bipyridyl;

a substituted 1,8-naphthiridine in either attachment to the respective X units through connection with the heterocyclic nitrogens in the 1,8-naphthiridine or which X units are actually the heterocyclic nitrogens in the 1,8-naphthiridine;

a substituted 1,9- or other ortho connection to each of the respective X units of and from anthracene;

a substituted 4,5- or other ortho connection to each of the respective X units of and from phenanthrene;

a substituted o-biphenylene-methane, diphenylenemethane or 2,2'-methylenebiphenyl- or other ortho connection to each of the respective X units;

a substituted o-phenanthroline or 1,10-phenanthroline in either attachment to the respective X units through connection with the heterocyclic nitrogens in the 4,5-phenanthroline or which X units are actually the heterocyclic nitrogens in the 4,5-phenanthroline;

In practicing the present invention, a preferred organometallic compound corresponds to the formula:

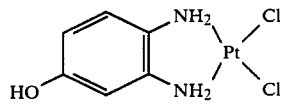

The organometallic compounds hereof are prepared by techniques known in the art, noted in the copending patent application.

The organometallic compounds are essentially, water insoluble, but are soluble in certain organic solvents, such as dimethyl formamide, N-methyl-2-pyrrolidone and p-dioxane.

Also, it has been found that the addition of a small amount of basic material to any organometallic solution will, usually, improve the solubility effect. Numerous basic substances may be employed for this purpose, including caustic soda, caustic potash, soluble carbonates and bicarbonates. Certain inorganic oxides and many organic base compositions such as alkaloids diphenylmethylammonium hydroxide, "Schiff's Base" preparations, ammonia and ammonium hydroxide will, also, increase the solubility. There is, of course, no limitation on the basic materials to employ for increasing solubility, so long as they do not react with the organometallic compound.

Suitable solvents for the organometallic compounds include, for example, glycerol; paraffin and other mineral oils; multiether compositions such as diglyme, triglyme, butyl ether, ethyl-n-butyl ether, di-n-amyl ether, diisoamyl ether, di-n-hexyl ether, ethylene glycol dimethyl ether, di-n-heptyl ether, di-n-decyl ether, halogenated derivatives thereof, and the like, dimethylsulfoxide, monoalkyl ethers obtained by the alcoholysis of ethylene and higher alkene oxides; dioxane and its derivatives.

In general, complexes of the present invention are prepared, most advantageously in the presence of water, by intimately intermixing and combining all of the materials to be complexed. This is best done by solution procedures using miscible or immiscible solvent systems for the respective components to be complexed, including systems in which the polymer solvent is comprised of a portion of the organometallic solvent in instances when the latter is miscible with the former. It can also be accomplished by dispersion procedures, in which either or both of the components are not fully or at all soluble in the solvent(s) utilized but undergo the complex-forming reaction upon making of intimate contact therebetween.

The product complexes that are formed can be either completely water-soluble, partially or limitedly soluble in water or water-insoluble materials.

Since the complexing interaction between the water-soluble compound and the organometallic compound is to a greater or lesser extent an equilibrium situation, especially when water is present and a water-soluble polymer is employed, systems where the formed complex precipitates are desirable.

In most cases, the complex-forming reaction can be conducted at normal ambient or room temperatures. Sometimes use of higher temperatures, such as those up to about 50° C. may be employed, especially if they tend to influence better dissolution (when solution systems are wanted) of one or the other of the complexing ingredients. It is rare to conduct the complexing at temperatures lower than about 15° C.

The complexing reaction occurs in a time period from about 5 to about 15 minutes.

The pH of the reaction mass is, also, an important factor. The reaction mass should be on the acid side, and the pH should range between about 1 to about 10. Optimally, a pH of about 4.5 is used.

To prepare the respective components for complexing, the water-soluble compound is, preferably, made into an aqueous solution thereof. However, as has been mentioned, it is possible for the compound, which is employed as a polymer, to be in a polymer solvent containing some portion of that solvent for dissolution of the organometallic in the instances when the latter is a water-miscible material. In such event, it is advisable for the aqueous polymer solvent to contain at least about 50 percent by volume of water in mixture or liquid solution with the water-miscible organometallic solvent employed. The concentration of the polymer in the water or other aqueous solvent therefor can be from as low as 1 or so to as high as about 60 wt. %, depending to some extent on the complexing technique to be utilized and the temperature employed, as well, of course, on the solubility characteristics of the particular polymer. As to the organometallic when made up in solution for the complexing reaction, it is desirable for at least about 5 percent of the total of the organometallic material utilized for reaction stock make-up to be dissolved in the solvent.

Particularly preferred complexes produced hereby are those derived from poly(2-ethyloxazoline); poly-N-vinyl-2-methyloxazolidinone; poly-N-vinyl-pyrrolidone; cis-dichloro(3,4-diaminophenol)Pt(II); cis-dichloro(3,4-diaminobenzoic acid)Pt(II) and cis-dichloro-(3,4-diaminobenzenesulfonic acid)Pt(II), in any combination of water-soluble polymer and square platinous compound.

For a more complete understanding of the present invention reference is made to the following, non-limiting example.

EXAMPLE 1

Without stirring, 0.2384 g. of 3,4-diaminophenol dihydrochloride (0.00121 mole) was dissolved at room temperature in 10.0 ml. of 1N aq. HCl in a 100-ml. round bottomed glass flask having a long single neck entry thereinto. The flask was wrapped with aluminum foil and placed in a 50° C. water bath wherein it was allowed to equilibrate. To this solution there was added 0.5000 g. (0.00121 mole) of potassium tetrachloroplatinate reagent. The charge of the $K_2PtCl_4$ was made in a single loading through a polyethylene funnel. To rinse the funnel after charging, 5.0 ml. of 1N aq. HCl was flushed therethrough into the flask. Thereupon, the flask was immediately stoppered and covered with aluminum foil. Although no stirring was utilized during the reaction, the charged flask was, at the outset, given several manual swirls to effect a homogeneous solution.

After 60 hours at 50° C., the aluminum foil wrapping was removed to terminate its light-excluding effect. This revealed the presence in the flask of a clear supernatant colored "yellow-green-brown", over clusters of dark, army-green colored crystals. The crystals were collected under reduced pressure; after which they were sequentially washed with successive 25 ml. portions of: first, water; then, acetone; and, finally, anhydrous diethyl ether. The crystals were placed overnight in a vacuum dessicator which was continuously pump-evacuated. A 94 percent theoretical yield was realized in the preparation.

EXAMPLE II

Example I was repeated, except that the starting material employed was 3,4-diaminobenzenesulfonic acid.

At 50° C., a 0.2500 g. (0.0016 mole) quantity of the starting material was dissolved in 10.0 ml. of sq. 1N HCl using a covered flask arrangement. Constant agitation with a magnetic stirrer was used.

To the clear, light-yellow solution of the starting material in acid there was then added 0.6640 g. (0.0016 mole) of potassium tetrachloroplatinate through a polyethylene charging funnel for the flask. The funnel was thereafter rinsed with two pipettefuls of the aq. 1N HCl; after which a glass stopper was inserted into the neck top of the flask for sealing. The flask was, then, foil wrapped. The preparation was, then, left to stand in the 50° C. constant temperature bath with uninterrupted stirring for 60 hours, taking care that no light got into the reaction mass. After this, the aluminum foil was removed. A reddish and cloudy opaque solution in which there was not the slightest discernability of any precipitate present was found.

In order to determine if any crystallization would take place at reduced temperature conditions, the solution-containing flask was refrigerated overnight at about 2°–3°. A slight amount of non-recoverable very fine purple-white powder was observed.

After failure to cause precipitate formation, in order to recover the cis-dichloro(3,4-diaminobenzenesulfonic acid)Pt(II) product, the reddish solution mixture (following failure of the crystallization attempt) was subjected to evaporation. This was done by putting the flask in a hot water bath maintained at about 42° C.; under reduced pressure of about 55 mm. Hg.

Continuous stirring of the liquid was kept up during evaporation procedure until a thick yellow mixture resulted.

The intermediate yellow mixture was then put under vacuum in a dessicator over anhydrous calcium chloride for about 5 days. After that treatment, the remaining material took on a tan appearance.

Completion of the recovery was accomplished by putting the solids-containing flask in the vacuum dessicator under less than 5 mm. Hg pressure for an extended period. The finally-treated solid was observed to be a good quality, fine purity product.

EXAMPLE III

The First Example procedure was repeated four times to prepare, respectively: cis-dichloro(o-phenylenediamine)Pt(II); cis-dichloro(3,4-diaminomethoxybenzene)Pt(II); cis-dichloro(3,4-diaminobenzoic acid)Pt(II); and cis-dichloro(2,3-diaminophenol)Pt(II), using different o-diaminobenzene starting materials.

Each of the resultant products, along with that of the First Example, were than chemically analyzed. TABLE III shows the results obtained.

TABLE III

| Platinous SPOM | ANALYTICAL RESULTS | | | | | |
|---|---|---|---|---|---|---|
| | Actual | | | Calculated | | |
| | % C | % H | % N | % C | % H | % N |
| m-HPt | 19.53 | 2.08 | 7.45 | 19.26 | 2.16 | 7.49 |
| m-OMePt | 20.99 | 2.62 | 6.94 | 20.80 | 2.49 | 6.93 |
| m-COOHPt | 20.29 | 2.06 | 6.72 | 20.11 | 1.93 | 6.74 |
| m-OHPt | 18.57 | 2.20 | 7.14 | 18.47 | 2.06 | 7.18 |
| o-OHPt | 18.42 | 2.12 | 7.12 | 18.47 | 2.06 | 7.18 |

EXAMPLE IV

A standard one dram vial was filled to the ⅜ inch level with water, after which there was therein, dissolved 0.06 gm. of K-30 poly-N-vinyl-2-methyloxazolidinone.

Another one-dram vial was charged with 0.04 gm. of m-COOHPt (as defined above) and then filled to the ¼ inch level with water. Solid NaHCO$_3$ was added in minute incremental portions to the m-COOHPt-containing vial with efficient Vortex-mixing between each addition. Gas evolution was noted with each of the bicarbonate inclusions. This was continued until a clear, dark blue solution was obtained. After this had happened, the solution was permitted to stand still for several minutes, whereupon the solution color changed to clear dark green.

All of the aqueous oxazolidinone solution from the first vial was added dropwise to the platinum compound solution in the second vial but no precipitation was observed and the solution retained its dark green color. Sixteen (16) drops of aq. 1N HCl were then slowly added to the second vial, after which a highly viscous gel formed; but no particle deposition could be observed at the bottom of the vial. The vial was allowed to stand for about ½ hour at the end of which time the gel became "soupy" and appeared as an opaque, olive-green mixture. Eight more drops of the aq. 1N HCl were subsequently added but this caused no further gas evolution nor did it cause any reappearance of the viscous gel formation. This indicated the production of the sodium salt complex of the oxazolidinone and the platinum compound.

EXAMPLE V

Using a one-dram vial, 0.06 g. of K-30 poly-N-vinyl-2-methyloxazolidinone was dissolved in ½ inch of dimethylformamide in the vial with Vortex-mixing thereof supplemented by stirring agitation with a wooden stick. There was then added to the solution of the polymer 0.02 g. of cis-dichloro(3,4-diaminobenzoic acid)Pt(II). Upon addition thereof, complete solution occurred. The resulting mixture had a clear blue color. This mixed solution was then poured into about 20 ml. of benzene. Upon swirling of the vial, a flaky, clumpy, gray-blue precipitate formed which settled out on the bottom of the vial. A few particles of the flaky precipitate were removed from the vial. They were put into a few drops of distilled water in another vial and were quickly, completely dissolved therein. The flakes were of uniform and continuous color.

The precipitate from the first vial was recovered by filtration, then, air dried. A hard, crumbly, gray-blue solid was obtained. The product was subjected to an infra-red spectrum analysis which indicated the formation of the complex.

EXAMPLE VI 0.0250 g. cis-dichloro(3,4-diaminobenzoic acid)Pt(II) was placed in a 1×7 cm. test tube. An amount of 0.67 ml. of 1 percent aqueous K-30 poly-N-vinyl-2-methyloxazolidinone was then added to the tube. The mixture was first manually swirled; then subjected to Vortex-mixing. Only partial solution was thereby caused.

An additional 0.68 ml. of the oxazolidinone solution was then added with additional vigorous shaking. Solution still did not occur. Upon standing, a finely-divided powder settled out on the bottom of the test tube.

Another 0.0250 g. of the platinum compound was put into another test tube to which was added 20 drops of glycerol and, thereafter, subjected to Vortex-mixing until a dark green suspension was formed. Some solution appeared to have taken place; but many undissolved platinum particles remained in visible suspension. Another 0.67 ml. amount of the oxazolidinone solution in water was added and the mixture again shaken. Partial solution of the platinum compound occurred. Then, an additional 0.67 ml. of the oxazolidinone solution was put into the second test tube. After this, almost all of the platinum compound appeared to dissolve. At the same time, a puffy flocculant formed. Upon standing, the flocculant became puffier and very slowly settled from the suspension.

In both instances, the complex was formed.

EXAMPLE VII

This example shows the bacteriological action of the complexes hereof.

Poly-N-vinyl-2-methyloxazolidinone with (a) cis-dichloro(3,4-diaminobenzoic acid)Pt(II); (b) cis-dichloro(3,4-diaminophenol)Pt(II) and (c) cis-dichloro(2,3-diaminophenol)Pt(II), 0.0003 g. samples of each were, separately, finely ground.

Each of the pulverized samples were then added to separate 100 ml. portions of hot, semi-solid agar. After this, they were each very thoroughly mixed and the resulting fine suspensions were then poured into bacterial culture growth plates. To each of these was then added 1 drop of E. Coli B culture broth from a dropping pipette. The cultured specimens were then incubated for 12 hours at 37° C. All of the plates then had a somewhat cloudy appearance indicative of some growth; but much less than that which occurred in the untreated reference plate cultured and incubated in the same way.

Three more separate samples of the same pulverized complexes were then sprinkled in individual 0.0003 gm. quantities over the surfaces of solid agar plates which had previously been cultured with E. Coli B by surface-streaking, then incubated as above. After incubation, each of the samples were prepared into specimens for scanning electron microscope inspections. This was done by first inverting the cultured and grown plates over formaldehyde fumes for fixation purposes. Then, small colonies of bacterial growth were scraped off the plate surfaces and mounted on stubs which were gold coated for 2 minutes. Pictures of each specimen were then taken.

Each of the obtained photographic results showed positive evidence of considerable bacterial filamentation and elongation. This demonstrated the bacterial growth regulation effectiveness as static agents of each of the complexes tested, since the filamentous growth effect is convincingly demonstrative of the capability of the agent to stop actual bacterial multiplication and force the bacteria into deleterious elongating development.

EXAMPLE IX

This example illustrates the use of the complexes hereof as hydrogenation catalysts.

A hydrogenation shaking apparatus is employed similar to that particularized and explained at pg. 65 of "Organic Chemistry" by L. Fieser and M. Fieser (1944 Ed.) published by D. C. Heath and Company of Boston.

Into the apparatus is charged 100 parts by weight of cyclohexene and 3 parts by weight of a poly-N-vinyl-pyrrolidone and cis-dichloro(3,4-diaminobenzoic acid)Pt(II) complex prepared with a 2:1 polymer to platinum compound ratio. Hydrogen is admitted at a pressure slightly in excess of atmospheric and the reaction conducted at 90° C. Conversion of the cyclohexene to cyclohexane is obtained.

Similar results are obtained when the foregoing is repeated except to substitute for the present complex 6 parts by weight of an analogous palladium complex is an analogous 2:1 polymer-to-organometallic compound ratio.

EXAMPLE X

This example illustrates the polyvinylpyrollidone hydrogenation of cottonseed oil using a polyvinylpyrollidone complex as the catalyst.

A 2:1 polymer to metallic compound complex is made of polyvinylpyrollidone of K-30 value and a cis-dichloro(3,4-diaminophenol)Ni(II).

Using the same apparatus and procedure as in Example IX except that the temperature was 180° C., there is charged for hydrogenation 100 parts by weight of cottonseed oil and 12 parts by weight of the complex. The hydrogenation is conducted with the gas under about 20 pounds per square inch pressure and continued until an iodine number of about 65 is attained in the hydrogenation product. A hardened cottonseed oil is realized.

In addition to those hereinabove enumerated uses, the present complexes evidence other potential areas of utility, such as, for example:

As electroplating agents (when water-soluble);

As electrochemical catalysts when the metallic portions are made with Pt(II), Pd(II), Ir(II) and/or Au(III), particularly, when the complexes are water-soluble and oxidation/reduction operations of the type utilized in chlor-alkali manufacture;

As electroconductive coating solutions for application to plastic and other film and membrane surfaces for use in capacitor manufacture and other purposes and applications where such materials are required;

As chemical intermediates for a wide variety of conceivable transformations, fabrications and syntheses; and In a wide variety of bioscientific applications such as pharmaceuticals and therapeutic agents, fungicides, insecticides, herbicides, germicides, nematocides, etc.

Many changes and modifications can readily be made in and adapted to embodiments and practices in accordance with the present invention without substantially departing from its apparent and intended spirit and scope.

Having, thus, described the invention what is claimed is:

1. As a composition of matter, a chemical complex, comprising:

a. a water-soluble compound having at least one amidocarbonylic unit in its structure and corresponding to either of the formulas:

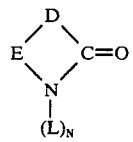

wherein C is carbon, N is nitrogen, O is oxygen, D is a divalent unit selected from the group consisting of oxygen, amino, linear alkylene having from 1 to 4 carbon atoms in the alkylene portion, methylene carbonyl, ethylene carbonyl and amido anhydride; E is an organic unit which introduces from 2 to 3 carbon atoms into the heterocyclic ring; L is selected from the group consisting of vinyl, allyl or isopropenyl, n is an integer ranging from one to about 5,000; or

wherein Q is either a linear or branched alkylene group of the formula

wherein $R_S$ is either hydrogen, or lower alkyl having from 1 to 7 carbon atoms in the alkyl portion; R is either alkyl, haloalkyl, or aminoalkyl having from about 1 to 10 carbon atoms in the alkyl portion, and y is an integer from about 2 to about 5000; or

where X is either alkyl, hydroxyalkyl, carboxyalkyl or aminoalkyl having from 1 to about 20 carbon atoms in the alkyl portion, or aryl, heteroaryl or substituted aryl; Y is either hydrogen or any X; n is an integer ranging from 1 to about 5000; or

where X is as defined above in (III), Y is either hydrogen or any X; $R_1$ is any Y; $R_2$ is any Y; n is an integer ranging from 1 to about 5000; and (b) a square planar organometallic compound corresponding to the formula:

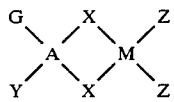

wherein M is a metal selected from either Group I B or Group VIII B of the Periodic Table, A is a substituted aromatic or heteroaromatic compound having substituents which function as a component of a bidentate ligand; X is an ortho substituent or a heteroatom which can bond to the metal; Y is either a substituted or unsubstituted amino group, sulfoxy, sulfhydryl, nitro, sulfonyl, amino, thiosulfonyl, ureido, amido, ureylene, hydroxy or carboxy; G is either hydrogen or any Y, and Z is, each, independently, a monodentate ligand or bonding sites within a multidentate ligand.

2. The composition of claim 1, wherein the water-soluble compound and the organometallic compound complectate are bonded in association by electrostatic interaction therebetween.

3. The composition of claim 1, wherein the water-soluble compound complectant and the organometallic compound are effectively bonded in association by hydrogen bonding.

4. The composition of claim 1 when the water-soluble compound of Formula (I) is a polymer.

5. The composition of claim 1, when the water-soluble compound is a polymer containing at least about 50 percent by weight, based on the total weight of repetitive amidocarbonylic units, the balance of polymerizate comprising one or more other monomers that are diverse from the monomeric precursors of the water-soluble compound and which are copolymerizable with monomeric N-vinyl-2-pyrrollidone.

6. The composition of claim 5, wherein the water-soluble compound contains at least about 80 percent, by weight, of the amidocarbonylic unit-containing repetitive units.

7. The composition of claim 1 wherein the water-soluble compound is a homopolymer.

8. The composition of claim 1, wherein the water-soluble compound has a K-value according to Fikentscher of between about 2 and about 200.

9. The composition of claim 8, wherein the K-value is between about 15 and about 90.

10. The composition of claim 9, wherein the water-soluble compound has a K-value of about 30.

11. The composition of claim 8, when the water-soluble compound comprises poly-N-vinylpyrrollidone.

12. The composition of claim 11, wherein the water-soluble compound consists essentially of poly-N-vinylpyrrollidone.

13. The composition of claim 8, wherein the water-soluble compound comprises substantially poly-N-vinyl-2-methyl-oxazolidinone.

14. The composition of claim 8, wherein the water-soluble compound is poly-N-vinyl-2-methyl-oxazolidinone.

15. The composition of claim 8, wherein the water-soluble compound consists essentially of poly(2-ethyloxazoline).

16. The composition of claim 8 wherein the water-soluble compound is a polyacrylamide.

17. The composition of claim 1, wherein the water-soluble compound and the organometallic compound are present, in a respective molar ratio of at least about 1:1.

18. The composition of claim 17, wherein the respective molar ratio is at least about 2:1.

19. The composition of claim 1, wherein M is Pt(II).

20. The composition of claim 1, wherein M is Ni(II).

21. The composition of claim 1, wherein A is a substituted 1,8-naphthiridine.

22. The composition of claim 1, wherein A is a substituted benzene.

23. The composition of claim 22, wherein the substituted benzene is a substituted phenolic derivative.

24. The composition of claim 21, wherein the substituted benzene is a substituted benzoic acid derivative.

25. The composition of claim 21, wherein the substituted benzene is a substituted benzenesulfonic acid derivative.

26. The composition of claim 1, wherein Z is chloro.

27. The composition of claim 1, wherein both are coalesced into and with a bidentate, diligandal, bivalent radical in chemical connection with the M in the Formula.

28. The composition of claim 26, wherein the bidentate, diligandal, bivalent radical is a 1,8-naphthypyridine.

29. The composition of claim 1, wherein X is a bivalent amine.

30. The composition of claim 1, wherein X is a bivalent carboxy derivative.

31. The composition of claim 1, wherein G is a monovalent member.

32. The composition of claim 1, wherein G is an alkyl radical containing from 1 to about 30 carbon atoms.

33. The composition of claim 1, wherein G is an aryl radical containing from 6 to about 12 carbon atoms.

34. As a chemical adapted to complex, cis-dichloro(3,4-diaminophenol)Pt(II).

35. The composition of claim 1, wherein the organometallic compound is cis-dichloro(3,4-diaminophenol)Pt(II).

36. The composition of claim 1, wherein the organometallic compound is cis-dichloro(3,4-diaminobenzoic acid)Pt(II).

37. The composition of claim 1, wherein the organometallic compound is cis-dichloro(3,4-diaminobenzenesulfonic acid)Pt(II).

38. A method of making the macromolecular complex of claim 1 comprising:
bringing together in intimate, thoroughly interdispersed contact at least about 1 molar quantity of the water-soluble compound for each molar quantity of the organometallic compound.

39. The method of claim 37, wherein the complexing compounds are dispersed.

40. The method of claim 37, wherein the complexing compounds are, each, present in their own liquid medium.

41. The method of claim 37, wherein the liquids are substantially immiscible and not common solvents for the water-soluble compound and the organometallic compound.

42. The method of claim 38, wherein the liquid medium for the water-soluble compound comprises at least about 50 volume percent of water.

43. The method of claim 37, wherein by bringing the complexing compounds are dispersed together in a common solvent to simultaneously dissolve at least part of each of them in the common solvent.

44. The method of claim 37, wherein the complexing compounds are complexed in a system having a pH between 1 and about 10.

45. The method of claim 37, wherein the pH is not greater than about 7.5.

46. The method of claim 44, wherein said pH is about 4.5.

47. As a composition of matter, a chemical complex consisting essentially of poly-N-vinylpyrrolidone and cis-dichloro(3,4-diaminophenol)Pt(II).

48. As a composition of matter, a chemical complex consisting essentially of poly-N-vinyl-2-methyloxazolidinone and cis-dichloro(3,4-diaminophenol)Pt(II).

49. As a composition of matter, a chemical complex consisting essentially of poly-N-vinylpyrrolidone and cis-dichloro(3,4-diaminobenzoic acid)Pt(II).

50. As a composition of matter, a chemical complex consisting of poly-N-vinyl-2-methyloxazolidinone and cis-dichloro(3,4-diaminobenzoic acid)Pt(II).

51. As a composition of matter, a chemical complex consisting essentially of poly-N-vinylpyrrolidone and cis-dichloro(3,4-diaminobenzenesulfonic acid)Pt(II).

52. As a composition of matter, a chemical complex, consisting essentially of poly-N-vinyl-2-methyloxazolidinone and cis-dichloro(3,4-diaminobenzene sulfonic acid)Pt(II).

53. As a composition of matter, a chemical complex comprising:
(a) a water-soluble compound corresponding to the formula:

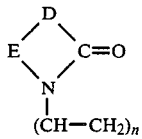

where D is methylene, E is ethylene and n is an integer ranging from about 2 to about 5000; and
(b) a square-planar platinous organometallic compound corresponding to the formula:

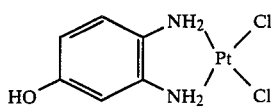

* * * * *